United States Patent
Bunke et al.

(10) Patent No.: US 12,099,958 B2
(45) Date of Patent: Sep. 24, 2024

(54) METHODS, SYSTEMS, AND COMPUTER PROGRAM PRODUCTS FOR ORDER COMPLIANCE TRACKING OF ELECTRONIC COMPONENTS

(71) Applicant: INTERNATIONAL BUSINESS MACHINES CORPORATION, Armonk, NY (US)

(72) Inventors: Christine Mary Bunke, Fishkill, NY (US); Rasit Onur Topaloglu, Poughkeepsie, NY (US); Vivian Zhang Di Tore, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/480,169

(22) Filed: Sep. 21, 2021

(65) Prior Publication Data

US 2023/0085699 A1    Mar. 23, 2023

(51) Int. Cl.
*G06Q 30/00*    (2023.01)
*G06Q 10/0831*    (2023.01)
(Continued)

(52) U.S. Cl.
CPC ..... *G06Q 10/0831* (2013.01); *G06Q 10/0875* (2013.01); *G06Q 30/018* (2013.01);
(Continued)

(58) Field of Classification Search
CPC .......... G06Q 10/0831; G06Q 10/0875; G06Q 30/018; G06Q 30/0607; G06Q 30/0631; G06Q 30/0635; G06Q 30/0639
(Continued)

(56) References Cited

U.S. PATENT DOCUMENTS 7,813,947 B2    10/2010    Deangelis
8,165,895 B2    4/2012    Nadas
(Continued)

OTHER PUBLICATIONS

Hürkamp, A., Gellrich, S., Ossowski, T., Beuscher, J., Thiede, S., Herrmann, C., & Dröder, K. (2020). Combining simulation and machine learning as digital twin for the manufacturing of overmolded thermoplastic composites. Journal of Manufacturing and Materials Processing, 4(3), 92. (Year: 2020) doi:https://doi.org/10.3390/jmmp4030092 (Year: 2020).*

(Continued)

*Primary Examiner* — Arielle E Weiner
(74) *Attorney, Agent, or Firm* — Elliot J. Shine

(57) ABSTRACT

A method, computer system, and a computer program product for order compliance is provided. The present invention may include determining a shipping destination for an order request received from a user, wherein the order request includes one or more items. The present invention may include generating a digital twin for each of the one or more items in the order request. The present invention may include determining a compliance of the order request with a plurality of importation requirements of the shipping destination based on an analysis of the digital twin for each of the one or more items. The present invention may include generating a compliance report for the order request, wherein the compliance report includes at least a compliance status of each item included in the order request.

17 Claims, 5 Drawing Sheets

(51) Int. Cl.
*G06Q 10/0875* (2023.01)
*G06Q 30/018* (2023.01)
*G06Q 30/0601* (2023.01)

(52) U.S. Cl.
CPC ..... *G06Q 30/0607* (2013.01); *G06Q 30/0631* (2013.01); *G06Q 30/0635* (2013.01); *G06Q 30/0639* (2013.01)

(58) Field of Classification Search
USPC ..................................................... 705/26.25
See application file for complete search history.

(56) References Cited

U.S. PATENT DOCUMENTS

| | | | |
|---|---|---|---|
| 8,396,838 B2 | 3/2013 | Brockway | |
| 8,495,068 B1* | 7/2013 | Awalt | G06Q 30/06 707/740 |
| 9,953,281 B2 | 4/2018 | Wiig | |
| 10,049,367 B2 | 8/2018 | Creager | |
| 10,318,986 B1* | 6/2019 | Southworth | G06Q 30/0267 |
| 10,339,321 B2 | 7/2019 | Tedeschi | |
| 10,755,225 B2 | 8/2020 | Goodman | |
| 10,795,855 B1 | 10/2020 | Difalco | |
| 2008/0091676 A1 | 4/2008 | Zwilling | |
| 2013/0080293 A1* | 3/2013 | Khin | G06Q 30/06 705/26.81 |
| 2016/0092885 A1* | 3/2016 | Creager | G06Q 30/06 705/317 |
| 2017/0083346 A1 | 3/2017 | Frankland | |
| 2018/0017405 A1* | 1/2018 | Chen | H04W 4/40 |
| 2018/0121980 A1 | 5/2018 | Blass | |
| 2019/0080379 A1* | 3/2019 | Dallahan | G06Q 30/0603 |
| 2020/0090185 A1* | 3/2020 | Chong | G06Q 30/018 |
| 2020/0251022 A1 | 8/2020 | Grant | |
| 2021/0049194 A1* | 2/2021 | Arcienega | G06F 16/3329 |
| 2021/0182996 A1* | 6/2021 | Cella | G06Q 30/0202 |
| 2021/0233129 A1* | 7/2021 | Bikumala | G06Q 10/0875 |
| 2021/0248653 A1* | 8/2021 | McKenzie | G06F 21/44 |
| 2022/0092669 A1* | 3/2022 | Abrahamian | G06Q 30/0631 |
| 2022/0138765 A1* | 5/2022 | Patterson | G06Q 10/103 705/317 |

OTHER PUBLICATIONS

Crews, "Costs and Burden of Federal Regulations Reach $1.9 Trillion," Competitive Enterprise Institute [news release], May 30, 2017 [accessed on Jul. 6, 2021], 3 pages, Retrieved from the Internet: <URL: https://cei.org/news_releases/costs-and-burden-of-federal-regulations-reach-1-9-trillion/>.

Disclosed Anonymously, "IoT Security Compliance Framework," IoTSF Certification Schema [online], Dec. 2, 2018, 46 pages, Retrieved from the Internet: <URL: https://www.iotsecurityfoundation.org/wp-content/uploads/2018/12/IoTSF-IoT-Security-Compliance-Framework-Release-2.0-December-2018.pdf>.

Jones, "Government Regulation: How Much Is Enough?," Investors.com [article], Nov. 13, 2018, 5 pages, Retrieved from the Internet: <URL: https://www.investors.com/politics/government-regulation-burden-cost/>.

Mell, et al., "The NIST Definition of Cloud Computing", National Institute of Standards and Technology, Special Publication 800-145, Sep. 2011, 7 pages.

Silberman, "A Step in the Right Direction: The IoT Cybersecurity Improvement Act", Security Boulevard, Feb. 5, 2021, available at <https://web.archive.org/web/20210205170144/https://securityboulevard.com/2021/02/a-step-in-the-right-direction-the-iot-cybersecurity-improvement-act/>, 7 pages.

* cited by examiner

METHODS, SYSTEMS, AND COMPUTER PROGRAM PRODUCTS FOR ORDER COMPLIANCE TRACKING OF ELECTRONIC COMPONENTS

BACKGROUND

The present invention relates generally to the field of computing, and more particularly to order compliance.

Legal and regulatory compliance with respect to the importation of products and/or goods may differ from region to region. For example, legal and regulatory compliance with respect to the importation of electronic devices and/or electronic components may be particularly difficult as several governmental agencies may regulate the same certification process.

End users may not have control over the certification process and may rely on the original parts and/or product manufacturers to maintain up to date certifications to remain in compliance.

SUMMARY

Embodiments of the present invention disclose a method, computer system, and a computer program product for order compliance. The present invention may include determining a shipping destination for an order request received from a user, wherein the order request includes one or more items. The present invention may include generating a digital twin for each of the one or more items in the order request. The present invention may include determining a compliance of the order request with a plurality of importation requirements of the shipping destination based on an analysis of the digital twin for each of the one or more items. The present invention may include generating a compliance report for the order request, wherein the compliance report includes at least a compliance status of each item included in the order request.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
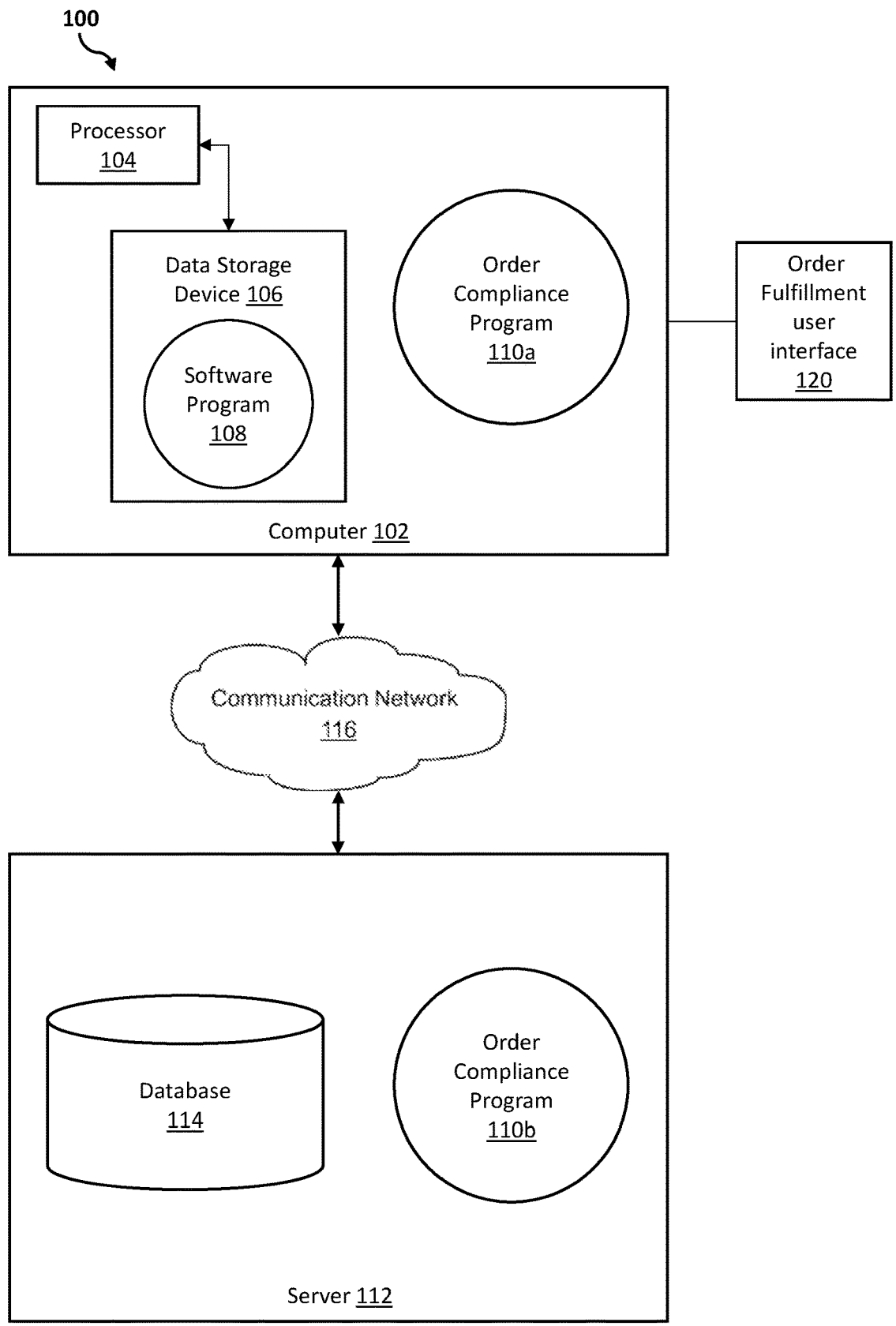
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for order compliance. As such, the present embodiment has the capacity to improve the technical field of order compliance by determining compliance of one or more items of an order request with a plurality of importation requirements of a shipping destination. More specifically, the present invention may include determining a shipping destination for an order request received from a user, wherein the order request includes one or more items. The present invention may include generating a digital twin for each of the one or more items. The present invention may include determining compliance with a plurality of importation requirements of the shipping destination based on an analysis of the digital twin for each of the one or more items. The present invention may include generating a compliance status for each of the one or more items based on the analysis.

As described previously, legal and regulatory compliance with respect to the importation of products and/or goods may differ from region to region. For example, legal and regulatory compliance with respect to the importation of electronic devices and/or electronic components may be particularly difficult as several governmental agencies may regulate the same certification process.

End users may not have control over the certification process and may rely on the original parts and/or product manufacturers to maintain up to date certifications to remain in compliance.

Therefore, it may be advantageous to, among other things, determine a shipping destination for an order request received from a user, wherein the order request includes one or more items, generate a digital twin for each of the one or more items in the order request, determine a compliance of the order request with a plurality of importation requirements of the shipping destination based on an analysis of the digital twin for each of the one or more items, and generate a compliance report for the order request, wherein the compliance report includes at least a compliance status for each item of the order request.

According to at least one embodiment, the present invention may improve compliance with importation requirements by determining compliance with a plurality of importation requirements of a shipping destination based on an analysis of the digital twin for each of the one or more items, wherein the analysis may be a clustering and/or classification analysis. The clustering and/or classification analysis may compare the digital twin for each of the one or more items with one or more previously generated digital twins. The one or more previously generated digital twins may have been generated for similar items and imported to the same shipping destination. The one or more previously generated digital twins may include information pertaining to why a product was non-compliant with the shipping destination which may be utilized in determining the compliance of the one or more items of the order request.

According to at least one embodiment, the present invention may improve the determination of a shipping destination of an order request by using one or more geolocation techniques. The one or more geolocation techniques may include, but are not limited to including, using a user's IP address, examining Wi-Fi hotspots, using a media access control (MAC) address, previous user orders, amongst other methods.

According to at least one embodiment, the present invention may improve identifying different part numbers used by one or more manufacturers for the same part by storing the equivalent part numbers in a knowledge corpus (e.g., a database). The knowledge corpus may be utilized in unifying part identification across practices and/or industries.

According to at least one embodiment, the present invention may improve manufacturer compliance by storing the certification status and expiration dates of one or more certifications in a knowledge corpus. Additionally, the present invention may improve manufacturer compliance by displaying and/or sending certification reminders to a manufacturer with respect to at least one or more expiring certificates.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an order compliance program 110a. The networked computer environment 100 may also include a server 112 that is enabled to run an order compliance program 110b that may interact with a database 114 and a communication network 116. The networked computer environment 100 may include a plurality of computers 102 and servers 112, only one of which is shown. The networked computer environment 100 may include an order fulfillment user interface 120. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the order compliance program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the order compliance program 110a, 110b (respectively) to determine compliance of an order request received from a user based on a shipping destination. In various embodiments of the invention, order compliance program 110, may execute locally on client computer 102 as a plug-in to an internet browser, or as a dedicated software application. In alternative embodiments, the order compliance program 110 may execute on server computer 112. The order compliance method is explained in more detail below with respect to FIG. 2.

Figure 2:
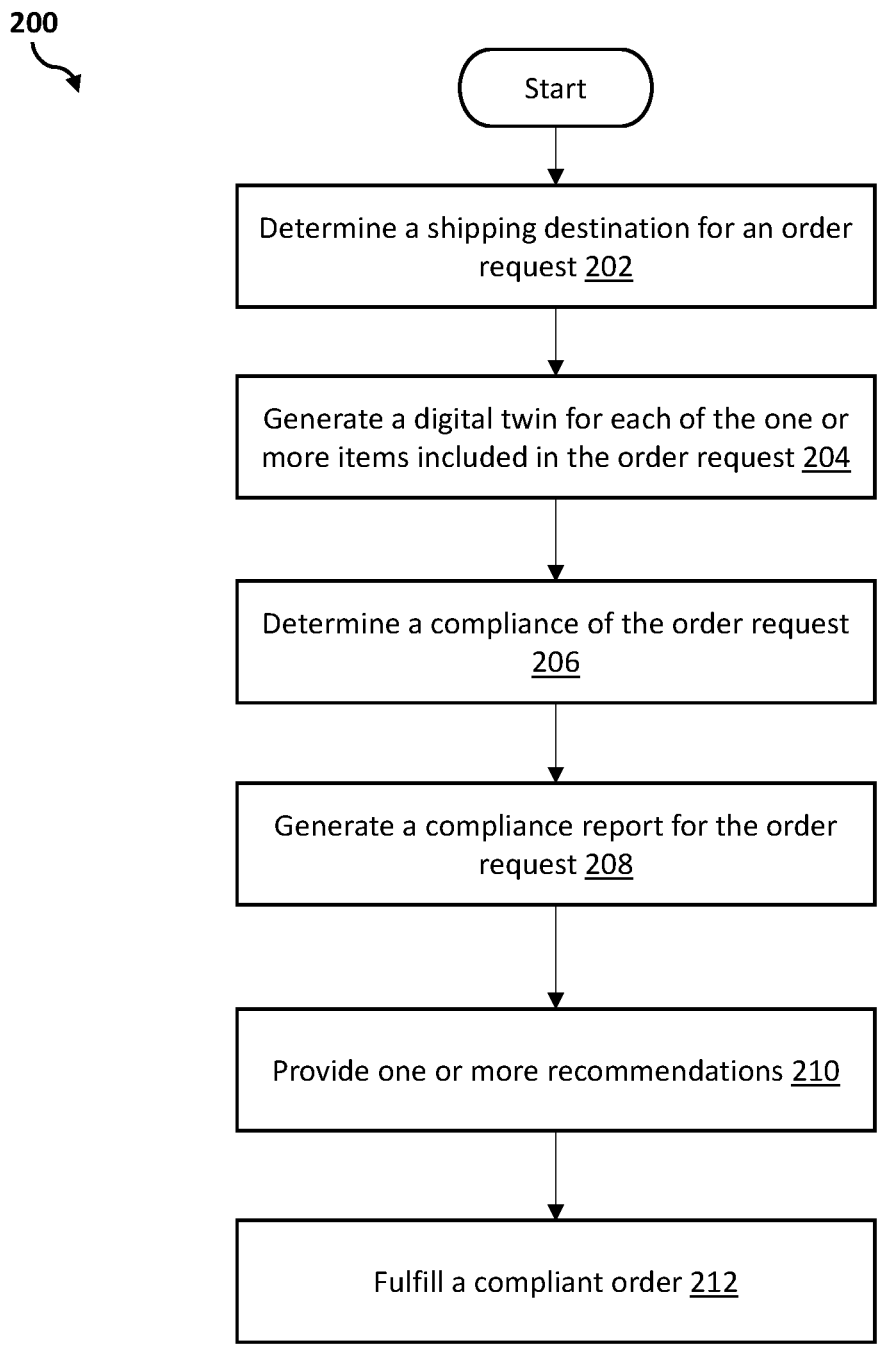
FIG. 2 is an operational flowchart illustrating a process for order compliance according to at least one embodiment.

Referring now to FIG. 2, an operational flowchart illustrating the exemplary order compliance process 200 used by the order compliance program 110a and 110b (hereinafter order compliance program 110) according to at least one embodiment is depicted.

At 202, the order compliance program 110 determines a shipping destination for an order request received from a user. The user may submit the order request to the order compliance program 110 using an order fulfillment user interface 120. The order fulfillment user interface 120 may be displayed by the order compliance program 110 in at least an internet browser, dedicated software application, or as an integration with a third party software application, amongst other mediums. The order request from the user may include, but is not limited to including, one or more items. The one or more items may include, but are not limited to including, one or more products, parts, or other deliverables. The order request may be at least an upgrade, repair, recurring order, or new order. The user submitting the order request may be at least a representative of a client and/or a new or existing client. In an embodiment, the one or more items may include electronic devices, computer equipment, electrical equipment, electrical components, amongst other products which may generate, store, transmit, transform, and/or utilize electrical energy.

The order compliance program 110 may determine the shipping destination for the order request using one or more geolocation techniques. The one or more geolocation techniques may be utilized in determining the shipping destination based on, at least, the user's IP address, examination of Wi-Fi hotspots, a media access control (MAC) address, previous user orders, location codes, amongst other methods. The order compliance program may determine the country, city, and/or zip code utilizing the one or more geolocation techniques. The order compliance program 110 may receive permission from the user through a prior waiver or other process that informs a subject that their data may be captured by appropriate devices, before utilizing the one or more geolocation techniques.

The order compliance program 110 may verify the shipping destination for the order request with the user. The order compliance program 110 may verify the shipping destination for the order request with the user using the order fulfillment user interface 120. The order compliance program 110 may utilize one or more methods for verifying the shipping destination, such as, but not limited to, a chatbot, a pop-up window, and/or a populated order form, amongst other methods. The one or more methods for verifying the shipping destination may be displayed to the user by the order compliance program 110 using the order fulfillment user interface 120.

As will be explained in more detail below, each shipping destination may require compliance with a plurality of importation requirements. The plurality of importation requirements may include, but are not limited to including, laws, regulations, original equipment manufacturer (OEM) certification requirements, customs requirements, amongst other importation requirements. The importation requirements for each shipping destination may depend, at least in part, on the products and/or parts being imported. The order compliance program 110 may maintain a knowledge corpus (e.g., database 114) including the importation requirements, for each product and/or part, for each shipping destination. The plurality of importation requirements may be updated based on at least, manual input by a compliance team, rejected and/or approved importation of previous orders, one or more data scraping and/or web scraping methods, new laws and/or regulations, amongst other methods.

At 204, the order compliance program 110 generates a digital twin for each of the one or more items included in the order request. A digital twin may be a virtual representation of an object or system which may be updated using real-time data, and may utilize, at least, simulation, machine learning, and/or reasoning in aiding informed decision making. The virtual representation may also include information, such as, but not limited to, part numbers, measurements, descriptions, and/or information derived from at least the bill of materials, manufacturer, or other resources. As will be explained in more detail below, the information included in the digital twin may be updated by the order compliance program 110.

The order compliance program 110 may generate the digital twin for each item based on one or more parts comprising an item. A product may be comprised of a plurality of parts. For each product of the order request the order compliance program 110 may utilize identifying information included in the order request, such as, but not limited to, a brand and/or a model number, amongst other identifying information, in identifying a bill of materials. For example, the order request may include a North American Industry Classification System (NAICS) code which may be utilized by the order compliance program 110 in identifying the bill of materials based on the manufacturer and other identifying information.

A bill of materials may be a centralized source of information used to manufacture a product. The bill of materials may include information, such as, but not limited to, the product code, part names, part numbers, part revisions, descriptions, quantities, units of measurement, drawings, design specifications, production processes, engineering information, quality control measures, equipment used, material composition of parts, amongst other associated records describing an assembly of a product. The order compliance program 110 may also identify additional information related to the product made available by the manufacturer and/or other entity.

A manufacturer may assign a part number to each of the one or more parts of the product. Different manufacturers may utilize different part numbers for the same part. For example, when referring to a "Hardware, screw, machine, 2-20, ¾" long," Manufacturer A may use part number "2-20-¾," Manufacturer B may use part number "100-220-0.550-3434-A," and Manufacturer C may use part number "TSR-1002."

The order compliance program 110 may utilize the bill of materials to generate the digital twin of the product. The digital twin may be the virtual representation of the product and may also incorporate information, such as, but not limited to, part numbers for each of the one or more parts comprising the product, amongst other information derived from the bill of materials. The order compliance program 110 may utilize a similar method in generating a digital twin for each part included in the order request. The order compliance program 110 may utilize the part number in generating a digital twin for each part included in the order request.

The order compliance program 110 may store equivalent part numbers and their corresponding specifications in the knowledge corpus (e.g., database 114). Continuing with the "Hardware, screw, machine, 2-20, ¾" long," example part outlined above, the order compliance program 110 may store part numbers "2-20-¾," "100-220-0.550-3434-A," and "TSR-20" as equivalent part numbers. The knowledge corpus (e.g., database 114) may store data based on at least previous order requests received by the order compliance program 110.

At 206, the order compliance program 110 determines a compliance of the order request with a plurality of importation requirements of the shipping destination. The order compliance program 110 may utilize the digital twin for each item included in the order request in determining the compliance of the order request. The compliance of the order request may be determined based on an analysis of the digital twin for each of the one or more items.

The order compliance program 110 may perform a clustering and/or classification analysis of each digital twin in determining the compliance of the order request. The order compliance program 110 may perform the analysis using, at least, the digital twin, one or more previously generated digital twins for similar items of the same shipping destination, and the equivalent part numbers and their specifications stored in the knowledge corpus (e.g., database 114), as input for the analysis. As will be explained in more detail below, the order compliance program 110 may utilize information included in the one or more preciously generated digital twins in providing compliance details for each item in generating the compliance report.

The order compliance program 110 may utilize an unsupervised machine learning model in performing the cluster analysis, and the machine learning model may utilize one or more clustering algorithms, such as, but not limited to, Balanced Iterative Reducing and Clustering using Hierarchies (BIRCH), Density-Based Spatial Clustering of Applications with Noise (DBSCAN), k-means clustering, amongst other clustering algorithms.

For example, the order request received from User 1 for shipping destination Country A may include an Alternating Current (AC) Adapter product, Product 1. Three other users, User 2, User 3, and User 4 have all previously submitted an order request for an AC Adapter Product, Product 2, Product 3, and Product 4, respectively. Each AC Adapter product may consist of three parts, a transformer, a rectifier, and an electronic filter. Accordingly, each Product consists of three parts, Part 1, the transformer, Part 2, the rectifier, and Part 3, the electronic filter. Product 2 was denied entry by customs agents into Country A, while Products 3 and 4 were delivered to Users 3 and 4 within Country A. The order compliance program 110 may generate a digital twin for Product 1, Digital Twin 1, and perform the clustering analysis for Digital Twin 1, using the Digital Twin 2, 3, and 4, corresponding to Products 2, 3, and 4, and the equivalent part numbers and their specifications stored in the knowledge corpus (e.g., database 114). The clustering analysis may show that Parts 2 and 3 of all the digital twins overlap significantly based on the equivalent part numbers data stored in the knowledge corpus (e.g., database 114). Additionally, the clustering may show short distances between Part 1 of Digital Twins 3 and 4, and short distances between Part 1 of Digital Twins 1 and 2. Furthermore, the Digital Twin 2 may include information that Part 1 failed the standby power electrical energy standards of Country A, and accordingly the order compliance program 110 may determine the compliance status for Product 1 is "noncompliant" with the importation requirements of Country A, based on the similarities between, Part 1, the transformer, of Product 1 and Part 1, the transformer, of Product 2, as identified in the clustering analysis. As will be explained in more detail below with respect to step 208, the compliance report for Product 1 may include compliance details such as "Part 1 of Product 1 was determined to be likely to fail the standby power electrical energy standards of Country A." Additionally, as will be explained in more detail below with respect to step 210, the order compliance program 110 may recommend Product 3 and/or Product 4 to the user as an alternative to Product 1 based on the proximity of Product 3 and/or Product 4 in the clustering analysis.

The order compliance program 110 may also perform a classification analysis in addition to or as an alternative to the clustering analysis. The order compliance program 110 may utilize a binary classification model in determining whether each of the one or more items complies with the plurality of importation requirements of the shipping destination. The binary classification model may utilize one or more algorithms, including, but not limited to, logistic regression, k-nearest neighbor, decision trees, support vector machines, naïve bayes, amongst others. Similar to the clustering analysis example above, the binary classification model may determine whether each item of the order request is "compliant" or "non-complaint" based on a comparison of the digital twin for the item and the one or more digital twins previously generated for similar items of the same shipping destination. In the above example, the order compliance program 110 may determine the compliance status for Product 1 may be "noncompliant," based on "noncompliant" Product 2, and as will be explained in more detail below, may recommend "compliant" Product 3 and/or "compliant" Product 4 to the user as an alternative to Product 1.

Any parts determined by the order compliance program 110 to violate the importation requirements of the determined shipping destination (e.g., to be noncompliant) may be stored in the knowledge corpus (e.g., database 114) and utilized by the order compliance program 110 to flag future order requests for a part and/or products including the noncompliant part and/or similar parts. In the above example, the transformer of Product 1 and Product 2 may be stored in the knowledge corpus (e.g., database 114).

The order compliance program 110 may also determine the compliance status for each of the one or more items of the shipping destination based on a certification status for the manufacturer. The certification status for the manufacturer may include, but is not limited to including, original equipment manufacturer (OEM) certification requirements, amongst other certification requirements of the manufacturer, expiration dates for certification requirements, amongst other information.

In an embodiment, the order compliance program 110 may determine the compliance status of each item of an order request of the user using additional and/or alternative compliance requirements, such as, but not limited to, company guidelines, expense reimbursement guidelines, Intellectual Property Rights (IPR) associated with each item, commodity classifications of each item, valuations, duty payments, amongst other compliance requirements.

At 208, the order compliance program 110 generates a compliance report for the order request. The compliance report may include at least the compliance status for each item of the order request, a certification status for each manufacturer, compliance details for each item, and one or more recommendations, amongst other information.

The order compliance program 110 may display the compliance report to the user using the order fulfillment user interface 120. The order compliance program 110 may include the compliance status of each item. The compliance status may use a tag of either compliant or noncompliant for each item of the order request. The order compliance program 110 may utilize colors, notifications, or other visual cues in distinguishing noncompliant items from compliant items. The compliance details may include information derived from the one or more previously generated digital twin for similar items of the same shipping destination.

At 210, the order compliance program 110 provides one or more recommendations for each item of the order request depending on the compliance status of the item. The order compliance program 110 may provide at least one or more recommendations for each noncompliant item of the order request. The order compliance program 110 may also provide one or more recommendations for one or more compliant items. The order compliance program 110 may provide the recommendations to the user using the fulfillment user interface 120. The one or more recommendations may include, but are not limited to including, one or more substitute items, switching a manufacturer, amongst other recommendations.

The topic monitoring program 110 may request additional information from the user with respect to the one or more items of the order request prior to providing the one or more recommendations. The additional information may include, but is not limited to including, projected use of the item, other products an item may be used in conjunction with, price range, time in which the user needs the item to last, amongst other additional information. The order compliance program 110 may request the additional information with respect to the one or more items of the order using the order fulfillment user interface 120, utilizing the order fulfillment user interface 120 to display one or more questions, forms to fill in, or other methods of requesting additional information.

The order compliance program 110 may utilize the additional information to simulate an interaction of an item. For example, the user may have submitted an order request for a part which was determined to comply with the importation requirements of the shipping destination, however, prior to fulfilling the order the order compliance program 110 may request additional information, including the two products the user plans to use the part with. Accordingly, the order compliance program 110 may generate a digital twin, according to the steps outlined above, for each of the products the user plans the item to interact with. The order compliance program 110 may utilize the digital twin generated for the part at step 204 to run a simulation with the digital twins of the two products. The order compliance program 110 may utilize the simulated interaction to provide one or more recommendations to the user. The order compliance program 110 may also provide the user with simulation data and/or display a visual representation of the simulation to the user using the order fulfillment user interface 120.

The order compliance program 110 may provide a recommendation to switch the manufacturer of the one or more items of the order request based at least in part on a certification status of the manufacturer; the certification status of the manufacturer may include, but is not limited to including, original equipment manufacturer (OEM) certification requirements of the manufacturer. The order compliance program 110 may store the certification status and expiration dates of one or more certifications in the knowledge corpus (e.g., database 114). In an embodiment, the order compliance program 110 may display and/or send certification reminders to a manufacturer with respect to at least one or more expiring certificates.

In an embodiment, the order compliance program 110 may also provide recommendations with respect to duty payments, valuations of the one or more items, commodity classifications of the one or more items, Intellectual Property Rights (IPR) of the one or more items, amongst other recommendations to the user that may be utilized in accurately describing the one or more items being imported.

At 212, the order compliance program 110 fulfills a compliant order for the user. The one or more items of the compliant order may meet the importation requirements of the shipping destination. The one or more items of the compliant order may be different than the one or more items of the order request received from the user, based on any recommendations for part and/or product replacements, as described previously.

The order compliance program 110 may receive feedback from the user with respect to the one or more items of the compliant order. The user may provide feedback to the order compliance program 110 using the order fulfillment user interface 120. The order compliance program 110 may utilize the feedback received from the user in providing one or more future recommendations. The order compliance program 110 may also utilize the feedback in updating the information included in the digital twin for each item.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
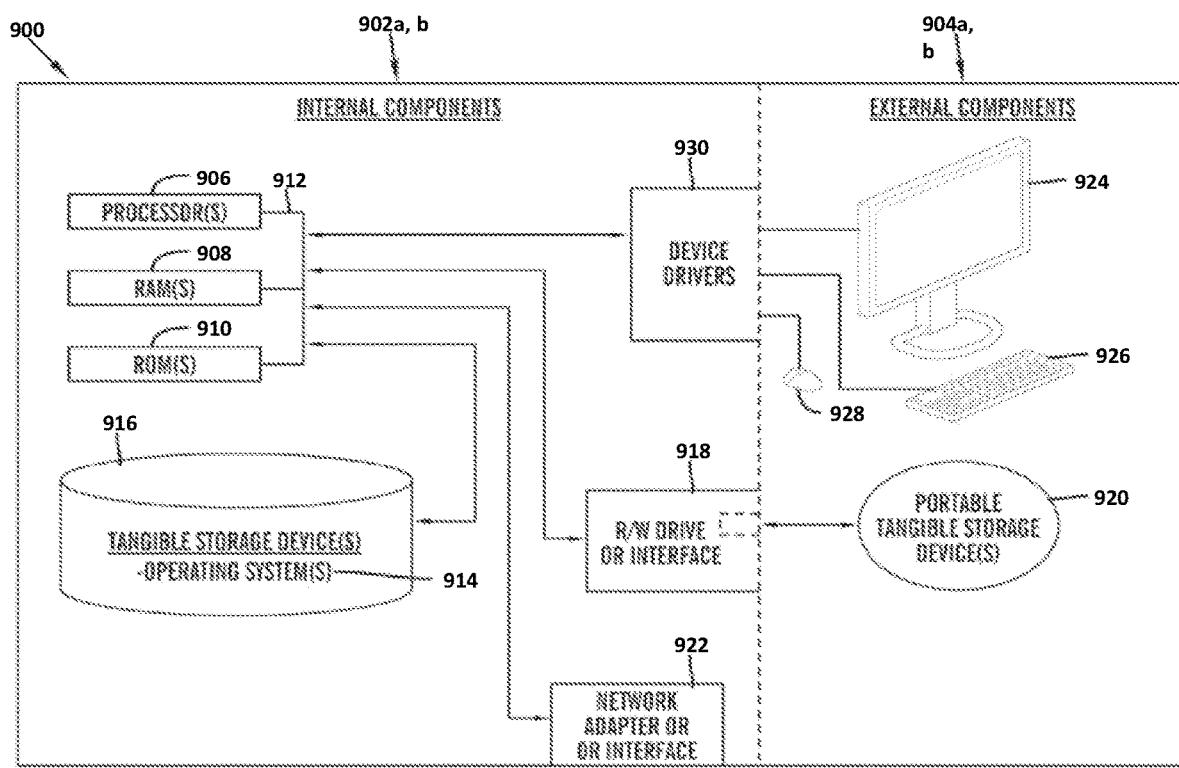
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the order compliance program 110a in client computer 102, and the order compliance program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the order compliance program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the order compliance program 110a in client computer 102 and the order compliance program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the order compliance program 110a in client computer 102 and the order compliance program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
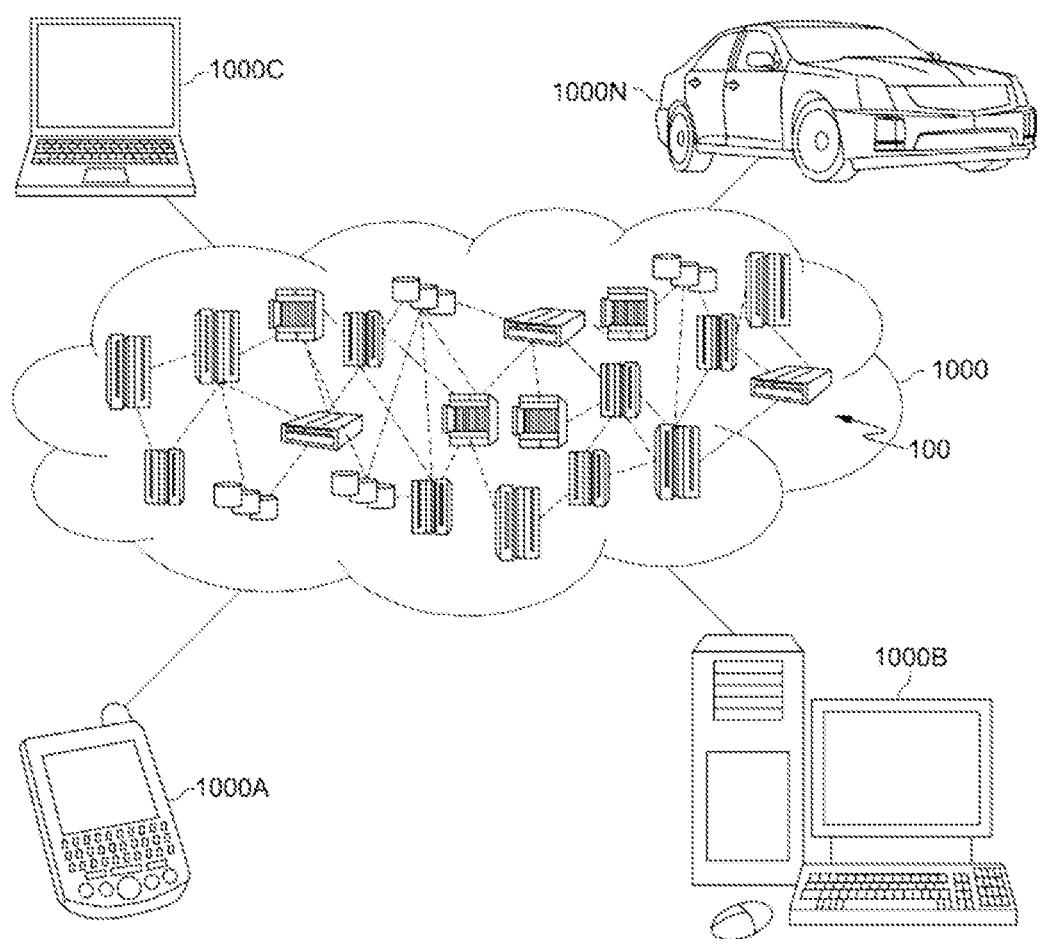
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
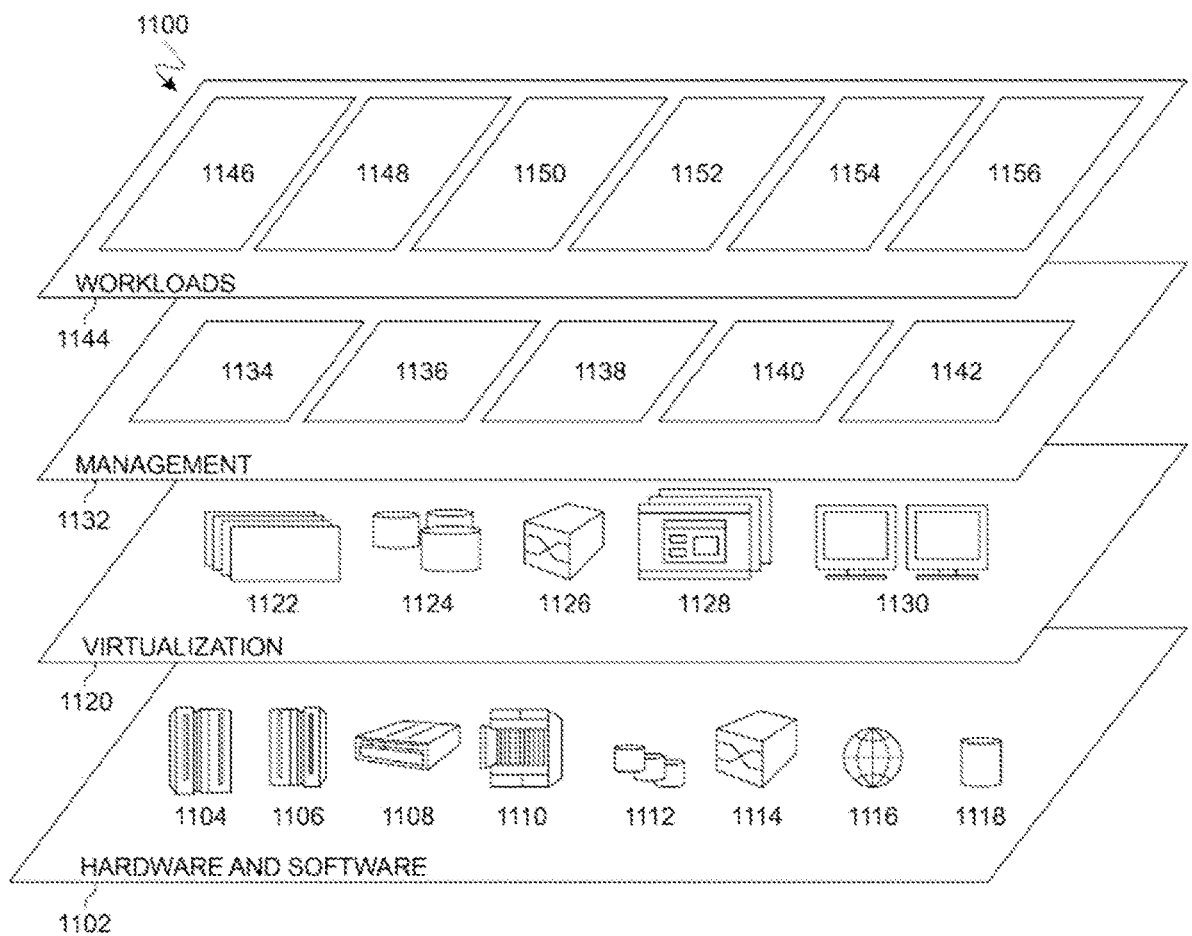
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and order compliance 1156. An order compliance program 110a, 110b provides a way to determine the compliance of one or more items of an order request with a plurality of importation requirements of a shipping destination.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for order compliance, the method comprising:
constructing a knowledge corpus of a plurality of importation requirements for a plurality of shipping destinations;
identifying a location of the a user based on an IP address of a user mobile device and determining a shipping destination for an order request received from a user in an order fulfillment user interface based on the location;
in response to identifying the location of the user based on the IP address of the mobile device, displaying a pop-up window in the order fulfillment user interface to verify the shipping destination with the user, wherein the order request includes one or more items;
generating a digital twin for each of the one or more items included in the order request;
identifying at least one noncompliant item within the one or more items of the order request based on an overlap of equivalent part numbers with a previously generated digital twin stored in the knowledge corpus determined based on a clustering analysis performed using a machine learning model and one or more clustering algorithms;
classifying the at least one noncompliant item as noncompliant for the shipping destination based on a classification analysis performed using a binary classification model, wherein the at least one noncompliant item is classified as noncompliant based on a comparison of the at least one non-compliant item with one or more previously generated digital twins for similar items and a same shipping destination;
generating a compliance report for the order request;
in response to classifying the at least one noncompliant item as noncompliant:
displaying, in the order fulfillment user interface, the compliance report, wherein the compliance report is comprised of one or more visual cues that distinguish the at least one noncompliant item from one or more compliant items included in the order request, and
presenting one or more prompts to the user in the order fulfillment user interface, wherein the one or more prompts request additional information with respect to the at least one non-compliant item of the order request, wherein the additional information includes one or more products the at least one noncompliant item would interact with and a price range for one or more potential substitute items;
in response to the user transmitting, via the order fulfillment user interface, the additional information, simulating one or more interactions between the one or more potential substitute items and the one or more products the at least one noncompliant item would interact with, and displaying a visual representation of the one or more interactions to the user in the order fulfillment user interface; and
recommending, in the order fulfillment user interface, at least one substitute item for the at least one noncompliant item based on simulation data generated from the one or more interactions.

2. The method of claim 1, wherein the machine learning model utilizes as input at least, one or more of, a digital twin for an item, the one or more previously generated digital twins, and one or more equivalent part numbers and their specifications.

3. The method of claim 1, further comprising:
fulfilling a compliant order for the user, wherein the compliant order is comprised of the one or more compliant items and at least one substitute item selected by the user from the one or more potential substitute items presented in the order fulfillment user interface to replace the at least one noncompliant item, wherein the compliant order meets the plurality of importation requirements of the shipping destination; and
receiving user feedback in the order fulfillment user interface, wherein the user feedback is utilized in providing one or more future recommendations and updating information included in the digital twin for each of the one or more compliant items of the compliant order.

4. The method of claim 1, further comprising:
determining a compliance status for each of the one or more items based on a certification status of a manufacturer, wherein the certification status of the manufacturer is displayed to the user in the order fulfillment user interface;

storing the certification status and an expiration date of one or more certifications associated with the manufacturer in the knowledge corpus, wherein the expiration date for each of the one or more certifications are utilized in sending certification reminders to the manufacturer;

recommending the user switch the manufacturer for at least one of the one or more items of the order request based on the certification status of the manufacturer stored in the knowledge corpus; and fulfilling a compliant order for the user, wherein the compliant order is comprised of one or more items for which the manufacturer meets certification requirements.

5. The method of claim 1, wherein the knowledge corpus is constructed based on at least, one or more of, importation of previous orders, previous order requests, laws or regulations for each of the plurality of shipping destinations, a plurality of previously generated digital twins including compliance details corresponding to items of the previous order requests, and manual input by a compliance team.

6. The method of claim 1, wherein the digital twin is a virtual representation of each of the one or more items included in the order request and is generated based on a bill of materials, wherein the bill of materials is identified based on identifying information included in the order request, wherein the virtual representation includes part numbers for each of the one or more parts comprising the product, and wherein the equivalent part numbers for the one or more parts are stored in the knowledge corpus.

7. The method of claim 1, wherein the machine learning model is an unsupervised machine learning model and the one or more clustering algorithms include at least, one or more of, Balanced Iterative Reducing and Clustering using Hierarchies (BIRCH), Density-Based Spatial Clustering of Applications with Noise (DBSCAN), and k-means clustering, and wherein the clustering analysis utilizes the one or more clustering algorithms in determining the overlap or distance between the part numbers of the digital twin and one or more equivalent part numbers of the previously generated digital twin.

8. The method of claim 1, further comprising: generating compliance details for the at least one noncompliant item based on the overlap, wherein the compliance report includes compliance details derived from the compliance details associated with the one or more previously generated digital twins for similar items and the same shipping destination, wherein the compliance details and a corresponding noncompliant part of the at least one noncompliant item are presented to the user in the order fulfillment user interface.

9. The method of claim 1, wherein the simulation data generated from the one or more interactions is displayed to the user within the virtual representation of the one or more interactions in the order fulfillment user interface, and wherein simulating the one or more interactions further comprises:

generating a digital twin for each of the one or more potential substitute items; and generating a digital twin for each of the one or more products the at least one noncompliant item would interact with.

10. The method of claim 1, further comprising:

updating the plurality of importation requirements stored in the knowledge corpus based on the at least one noncompliant item, wherein the at least one noncompliant item is utilized as additional input for the clustering analysis and the classification analysis in flagging similar items of future order requests.

11. A computer system for order compliance, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

constructing a knowledge corpus of a plurality of importation requirements for a plurality of shipping destinations;

identifying a location of the a user based on an IP address of a user mobile device and determining a shipping destination for an order request received from a user in an order fulfillment user interface based on the location;

in response to identifying the location of the user based on the IP address of the mobile device, displaying a pop-up window in the order fulfillment user interface to verify the shipping destination with the user, wherein the order request includes one or more items;

generating a digital twin for each of the one or more items included in the order request;

identifying at least one noncompliant item within the one or more items of the order request based on an overlap of equivalent part numbers with a previously generated digital twin stored in the knowledge corpus determined based on a clustering analysis performed using a machine learning model and one or more clustering algorithms;

classifying the at least one noncompliant item as noncompliant for the shipping destination based on a classification analysis performed using a binary classification model, wherein the at least one noncompliant item is classified as noncompliant based on a comparison of the at least one non-compliant item with one or more previously generated digital twins for similar items and a same shipping destination;

generating a compliance report for the order request;

in response to classifying the at least one noncompliant item as noncompliant:

displaying, in the order fulfillment user interface, the compliance report, wherein the compliance report is comprised of one or more visual cues that distinguish the at least one noncompliant item from one or more compliant items included in the order request, and presenting one or more prompts to the user in the order fulfillment user interface, wherein the one or more prompts request additional information with respect to the at least one non-compliant item of the order request, wherein the additional information includes one or more products the at least one noncompliant item would interact with and a price range for one or more potential substitute items;

in response to the user transmitting, via the order fulfillment user interface, the additional information, simulating one or more interactions between the one or more potential substitute items and the one or more products the at least one noncompliant item would interact with, and displaying a visual representation of the one or more interactions to the user in the order fulfillment user interface; and recommending, in the order fulfillment user interface, at least one substitute item for the at least one noncompliant item based on simulation data generated from the one or more interactions.

12. The computer system of claim 11, wherein the machine learning model is an unsupervised machine learning model and the one or more clustering algorithms include at least, one or more of, Balanced Iterative Reducing and Clustering using Hierarchies (BIRCH), Density-Based Spatial Clustering of Applications with Noise (DBSCAN), and k-means clustering.

13. The computer system of claim 11, wherein the knowledge corpus is constructed based on at least, one or more of, importation of previous orders, previous order requests, laws or regulations for each of the plurality of shipping destinations, a plurality of previously generated digital twins including compliance details corresponding to items of the previous order requests, and manual input by a compliance team.

14. The computer system of claim 11, further comprising:
fulfilling a compliant order for the user, wherein the compliant order is comprised of the one or more compliant items and at least one substitute item selected by the user from the one or more potential substitute items presented in the order fulfillment user interface to replace the at least one noncompliant item, wherein the compliant order meets the plurality of importation requirements of the shipping destination; and
receiving user feedback in the order fulfillment user interface, wherein the user feedback is utilized in providing one or more future recommendations and updating information included in the digital twin for each of the one or more compliant items of the compliant order.

15. The computer system of claim 11,
determining a compliance status for each of the one or more items based on a certification status of a manufacturer, wherein the certification status of the manufacturer is displayed to the user in the order fulfillment user interface;
storing the certification status and an expiration date of one or more certifications associated with the manufacturer in the knowledge corpus, wherein the expiration date for each of the one or more certifications are utilized in sending certification reminders to the manufacturer;
recommending the user switch the manufacturer for at least one of the one or more items of the order request based on the certification status of the manufacturer stored in the knowledge corpus; and
fulfilling a compliant order for the user, wherein the compliant order is comprised of one or more items for which the manufacturer meets certification requirements.

16. A computer program product for order compliance, comprising:
one or more non-transitory computer-readable tangible storage media and program instructions stored on at least one of the one or more non-transitory computer-readable tangible storage media, the program instructions executable by a processor to cause the processor to perform a method comprising:
constructing a knowledge corpus of a plurality of importation requirements for a plurality of shipping destinations;
identifying a location of the a user based on an IP address of a user mobile device and determining a shipping destination for an order request received from a user in an order fulfillment user interface based on the location;
in response to identifying the location of the user based on the IP address of the mobile device, displaying a pop-up window in the order fulfillment user interface to verify the shipping destination with the user, wherein the order request includes one or more items;
generating a digital twin for each of the one or more items included in the order request;
identifying at least one noncompliant item within the one or more items of the order request based on an overlap of equivalent part numbers with a previously generated digital twin stored in the knowledge corpus determined based on a clustering analysis performed using a machine learning model and one or more clustering algorithms;
classifying the at least one noncompliant item as noncompliant for the shipping destination based on a classification analysis performed using a binary classification model, wherein the at least one noncompliant item is classified as noncompliant based on a comparison of the at least one non-compliant item with one or more previously generated digital twins for similar items and a same shipping destination;
generating a compliance report for the order request;
in response to classifying the at least one noncompliant item as noncompliant:
displaying, in the order fulfillment user interface, the compliance report, wherein the compliance report is comprised of one or more visual cues that distinguish the at least one noncompliant item from one or more compliant items included in the order request, and
presenting one or more prompts to the user in the order fulfillment user interface, wherein the one or more prompts request additional information with respect to the at least one non-compliant item of the order request, wherein the additional information includes one or more products the at least one noncompliant item would interact with and a price range for one or more potential substitute items;
in response to the user transmitting, via the order fulfillment user interface, the additional information, simulating one or more interactions between the one or more potential substitute items and the one or more products the at least one noncompliant item would interact with, and displaying a visual representation of the one or more interactions to the user in the order fulfillment user interface; and
recommending, in the order fulfillment user interface, at least one substitute item for the at least one noncompliant item based on simulation data generated from the one or more interactions.

17. The computer program product of claim 16, further comprising:
fulfilling a compliant order for the user, wherein the compliant order is comprised of the one or more compliant items and at least one substitute item selected by the user from the one or more potential substitute items presented in the order fulfillment user interface to replace the at least one noncompliant item, wherein the compliant order meets the plurality of importation requirements of the shipping destination; and receiving user feedback in the order fulfillment user interface, wherein the user feedback is utilized in providing one or more future recommendations and updating information included in the digital twin for each of the one or more compliant items of the compliant order.

* * * * *